UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL CO., OF NEW YORK, N. Y., A CORPORATION OF NEW YORK.

COMPOUNDS CONTAINING ACTIVE OXYGEN.

1,185,216.     Specification of Letters Patent.     Patented May 30, 1916.

No Drawing.     Application filed December 24, 1913. Serial No. 808,532.

*To all whom it may concern:*

Be it known that I, OTTO LIEBKNECHT, a subject of the Emperor of Germany, residing at Frankfort-on-the-Main, Germany, have invented certain new and useful Improvements in Compounds Containing Active Oxygen, of which the following is a full, clear, and exact specification.

This invention relates to new compounds containing active oxygen in the form of a persalt and a base other than an alkali metal, such as magnesium.

In U. S. Patents #816,925 and #842,470 heretofore issued to me, I have described the manufacture of magnesium perborate and sodium perborate respectively. In course of time it has been found that sodium perborate as well as magnesium perborate each have their own shortcomings. It has furthermore been found that the general properties of sodium perborate in various particulars make it the more desirable substance provided its stability can be increased without sacrificing any of its advantages.

In the researches concerning the manufacture of perborates I have now found a new process by which I may produce a perborate salt of desirable stability, containing both sodium and magnesium.

The advantages of my new process are great and important as it immediately turns out products having superior properties, the new salt especially possessing the great advantage over the sodium perborate of being greatly resistant to the decomposing effect exerted by catalyzers. Solutions containing said new salt are mainly intended for use in bleaching establishments which very often employ copper vessels, the walls of which act as a catalyzer on substances containing active oxygen, but it has been found that the new salt obtained by the process described below is not effected by the copper and only very gradually splits off its oxygen. The mother lyes in my process may easily be evaporated without sustaining any noticeable loss of oxygen. Finally I may say the new salt greatly facilitates the manufacturing operations owing to its crystalline form, thus easily permitting separation from the mother lye, while the amorphous form of the plain magnesium-perborates is very troublesome.

The compounds produced by my new process are of superior stability and are conveniently obtained by adding magnesium salts to a solution or a suspension of perborates respectively. The produced salt is a perborate containing magnesium, the crystalline structure of which does not appear to be changed; the mother liquor remaining after the separation of the crystals shows more or less magnesium according to the quantity of magnesium salts added to the charge.

To carry my invention into effect I may proceed as illustrated by the following example: 630 parts of borax with 132 parts of sodium hydrate are dissolved in 4000 parts of water, whereupon 1000 parts of a 22.6% solution of hydrogen peroxid are added, the solution being cooled during the addition to prevent any considerable rise in temperature. After the produced perborate has nearly all separated out of the liquor a solution of 110 gr. magnesium chlorid ($MgCl_2 + 6H_2O$) is introduced. The mixture is stirred for about one hour when the precipitated salt is separated from the lye by filtration and is directly dried without being washed. The magnesium chlorid may also be substituted by a corresponding quantity of another magnesium compound, like magnesium sulfate, magnesium hydroxid, etc., though said quantity may be reduced or increased as the situation may require. Furthermore the magnesium salt may be added at any stage of the process.

I have not yet been able to decide whether the magnesium contained in the product obtained by this process, penetrates into the molecule of sodium perborate or whether it covers only the crystallized perborate with a kind of protecting layer. Similar results are obtained by an even simpler method if for instance the more or less dry perborate is soaked with a solution of a magnesium salt and is allowed to stand for some time to be then dried in the well known way on the filter; the obtained mother lye, containing magnesium, is then either evaporated or is preferably used over again in this or other processes of manufacturing perborates.

It is of course understood that the above process may be changed without departing from the spirit of the invention inasmuch as it holds good also of the known alkali perborates in general and as the magnesium compounds mentioned above may finally be substituted altogether by any compounds the base of which is not an alkali metal and is able to form perborate salts, as for instance zinc compounds, etc., which variations are claimed to come within the scope of the invention.

What I claim and desire to secure by Letters Patent is:

1. As a new product, a stable perborate in the form of a double salt consisting of an alkali perborate and another perborate the base of which is other than an alkali metal.

2. As a new product, a stable perborate in the form of a stable salt consisting of sodium perborate and another perborate the base of which is other than an alkali metal.

3. The process of manufacturing a stable sodium perborate containing a magnesium compound consisting in reacting on sodium perborate with a magnesium compound.

4. As a new product, a stable sodium perborate in the form of a double salt consisting of both sodium and magnesium perborate.

5. As a new product, a stable alkali perborate associated with a perborate of a base other than an alkali metal.

In testimony whereof I have signed this specification in the presence of two subscribing witnesses.

OTTO LIEBKNECHT.

Witnesses:
  JEAN GRUND,
  CARL GRUND.